United States Patent
Okuyama et al.

(10) Patent No.: US 6,785,204 B1
(45) Date of Patent: Aug. 31, 2004

(54) ACTUATOR CONTROL DEVICE

(75) Inventors: Atsushi Okuyama, Chiyoda (JP); Shinya Imura, Chiyoda (JP); Masato Soma, Yokohama (JP); Norihisa Yanagihara, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 600 days.

(21) Appl. No.: 09/644,571

(22) Filed: Aug. 24, 2000

(30) Foreign Application Priority Data

Sep. 20, 1999 (JP) .......................................... 11-265007

(51) Int. Cl.$^7$ ................................................. G11B 7/00
(52) U.S. Cl. ................................ 369/44.32; 369/53.28
(58) Field of Search ........................... 369/44.11, 44.14, 369/44.15, 44.17, 44.18, 44.25, 44.28, 44.29, 44.32, 53.12, 53.18, 53.23, 53.28, 53.3, 59.21

(56) References Cited

U.S. PATENT DOCUMENTS

| | | | | |
|---|---|---|---|---|
| 5,402,400 A | * | 3/1995 | Hamada et al. | 360/78.06 |
| 5,970,033 A | * | 10/1999 | Nakano et al. | 369/44.29 |
| 6,351,440 B1 | * | 2/2002 | Fukuda et al. | 369/47.36 |
| 6,392,966 B1 | * | 5/2002 | Kamiyama | 369/44.28 |
| 6,414,815 B1 | * | 7/2002 | Lee | 360/78.12 |

FOREIGN PATENT DOCUMENTS

| | | |
|---|---|---|
| JP | 7-130114 | 5/1995 |
| JP | 11-16308 | 1/1999 |

* cited by examiner

Primary Examiner—Thang V. Tran
Assistant Examiner—Bach Vuong
(74) Attorney, Agent, or Firm—Antonelli, Terry, Stout & Kraus, LLP

(57) ABSTRACT

An actuator control device is provided for performing some modifications such as making the output of a disturbance observer zero for quickly restoring the proper tracking control if the out-of-track state takes place and if the outside force exceeding the maximum force generated by an actuator is applied to the device itself. In the actuator control device, a disturbance observer estimates disturbance added to the actuator. The second control signal corresponding to the estimated disturbance is added to the first control signal. The added signal is made to be a third control signal. Further, the second control signal is stored in a storage unit. The stored value is further added to the third control signal as the fifth control signal. By performing some modifications such as making the second control signal zero according to the abnormal state, this arrangement makes it possible to quickly restore the proper tracking control even if the out-of-track state takes place.

11 Claims, 10 Drawing Sheets

ACTUATOR CONTROL DEVICE

BACKGROUND OF THE INVENTION

The present invention relates to a disk device, and more particularly to an actuator control device for driving a head having at least a function of reading information.

A typical conventional disk storage device has been disclosed in JP-A-6-267211.

This disk storage device includes a first correcting unit for adding a first disturbance compensating signal for canceling disturbance into an input signal of a driving circuit for correcting the input signal, a storage unit for storing the first disturbance compensating signal and outputting it, a second correcting unit for adding a second disturbance compensating signal for canceling the disturbance left out of the previous compensation into a position compensating signal for correcting the position compensating signal, an estimating unit for estimating the second disturbance compensating signal, and a disturbance compensating signal modifying unit for storing an added signal of the first and the second disturbance compensating signals as a new first disturbance compensating signal in the storage unit. This disk storage device arranged as above is served to cancel the adverse effect on the positioning control system by disturbance or vibrations. Hence, the provision of the disk storage device makes it possible to improve the positioning accuracy and shorten the access time.

The conventional disk storage device as disclosed in JP-A-6-267211, however, does not provide the following capability. If such external force like an external shock as exceeding the maximum force generated by an actuator (referred to as the maximum generation of the actuator) is applied to the apparatus provided with the actuator so that its tracking control is lost (referred to as "out of track" or "out of tracking"), it is highly likely that the conventional device may continue to move the head over the tracks in the "out of tracking" state, making it impossible to restore the tracking control state.

This is because the position error signal gets out of a controllable feedback area so that the signal may be in reverse polarity to that of the positive feedback area and thus a disturbance estimating operation by a disturbance observer may be made divergent.

SUMMARY OF THE INVENTION

It is an object of the present invention to provide an actuator control device which may provide a capability of performing such a modification as making an output of the disturbance observer zero and quickly returning to the tracking control state if the external force like an external shock exceeding the maximum generation of the actuator may be applied to the device itself or the "out of tracking" takes place.

According to an aspect of the invention, the actuator control device includes a head for recording and reproducing information on and from a disk, one or more actuators for moving the head, a position detector for defecting a position of the head, a control unit for controlling the actuator based on the position of the head, a disturbance observer for estimating a disturbance amount added to the actuator, a storage unit for storing the estimated disturbance, an adding unit for adding an output of the disturbance observer and an output of the storage unit to an output of the control unit, and a driving circuit for driving the actuator on the basis of the output of the adding unit. The actuator control device is further equipped with an abnormality detector for detecting an application of an external shock to the device on the basis of the position of the head and the output of the disturbance observer and a modifying unit for modifying an output of the disturbance observer according to the output of the abnormality detector, for the purpose of modifying the output of the disturbance observer if external force like an external shock exceeding the maximum generation of the actuator is applied to the device itself.

As the abnormality detector, a feedback area detector is provided for detecting a positive feedback area and a negative feedback area of the head position and for modifying the output of the disturbance observer according to the output of the feedback area detector.

Further, as the abnormality detector, a vibration detector is provided for detecting vibrations added to the device itself through the use of an accelerometer and a vibrometer provided in the detector itself.

DESCRIPTION OF THE EMBODIMENTS

Hereafter, an embodiment of the present invention will be described with reference to the appended drawings.

At first, an example of an overall arrangement of an optical disk apparatus to which the present invention is applied will be described with reference to FIG. 1.

Figure 1:
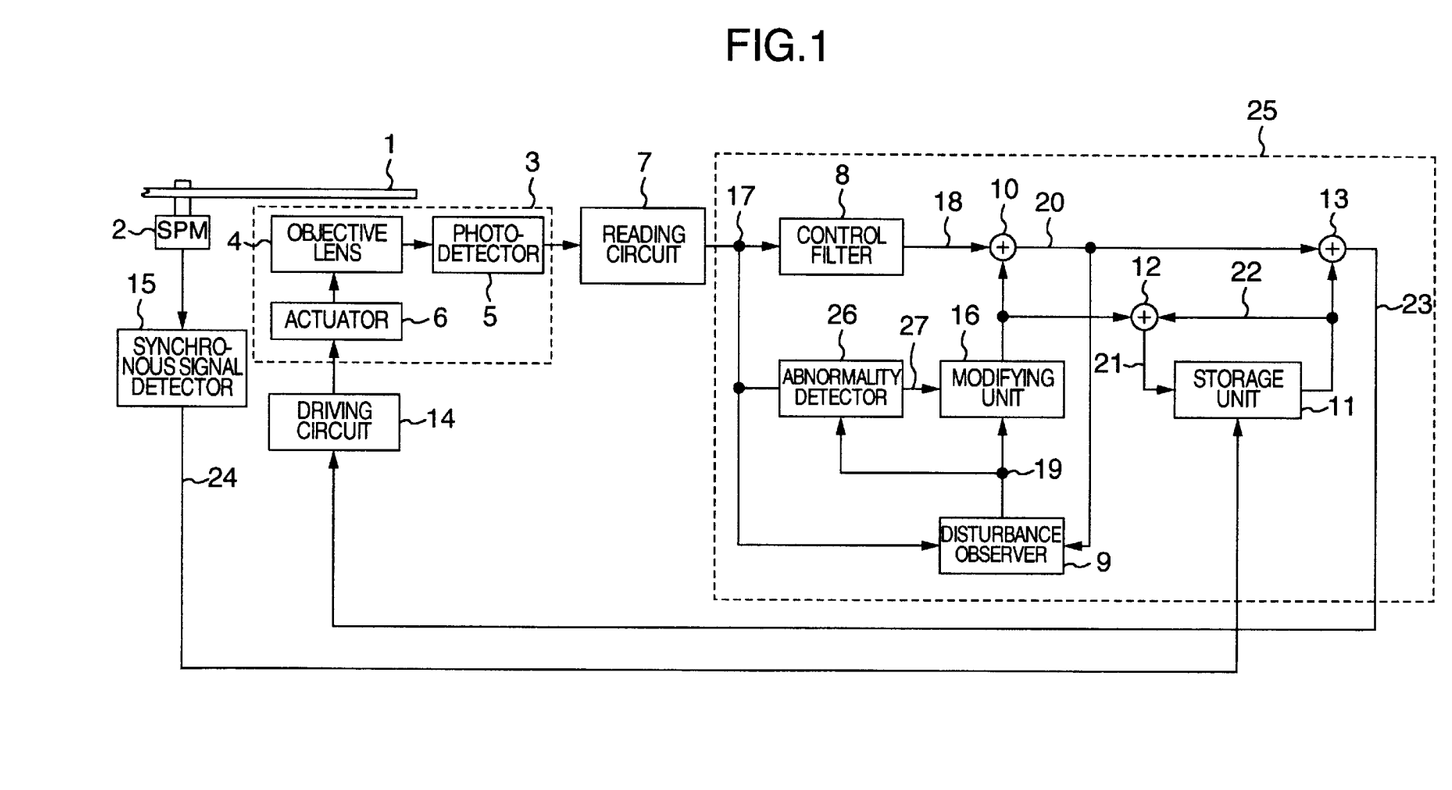
FIG. 1 is a block diagram showing an actuator control device according to a first embodiment of the present invention.

FIG. 1 is a block diagram showing the optical disk apparatus to which an actuator control device according to the first embodiment of the invention is applied.

An optical disk 1 includes a track (not shown) formed spirally on the circumferencial direction. This optical disk 1 may be loaded to or unloaded from the main body of the disk device by means of a loading and unloading mechanism (not shown). A spindle motor 2 (SPM) is served to rotate the optical disk the upper surface of which is fixed to a rotation shaft by a chucking mechanism. A pick-up unit 3 constituting the head is comprised of a semiconductor laser (not shown) for emitting a laser beam, an objective lens 4 for condensing the laser beam, and a photodetector 5 for sensing the beam reflected from the optical disk 1. This head is driven by an actuator 6 for moving the objective lens 4 in the tracking direction. A reading circuit 7 includes a position detecting unit composed of a detector for detecting a position (not shown). An output signal from the reading circuit 7 is applied to a control mechanism 25. The control mechanism 25 is composed of a control filter 8 constituting a control unit, a disturbance observer 9, a first adder 10, a storage unit 11, a second adder 12, and a third adder 13. The control mechanism 25 operates to apply the output thereof to a driving circuit 14 and a synchronous signal detector circuit 15.

The control mechanism 25 is provided with an abnormality detector 26 for detecting if a large disturbance or the like is applied on the basis of the signal from the reading circuit and a modifying unit 16 for modifying the output of the disturbance observer on the basis of the detection signal. The following signals are flown through their signal lines, respectively; a tracking error signal 17, a first control signal 18, a second control signal 19, a third control signal 20, a fourth control signal 21, a fifth control signal 22, a sixth control signal 23, a synchronous signal 24, and an abnormality detection signal 27. The control mechanism 25 is composed of an analog circuit or a digital circuit. If it is the digital circuit, the control mechanism 25 needs both an A/D converter and a D/A converter.

In the foregoing arrangement, the reading circuit 7 performs a predetermined signal processing on the detection output of the pick-up unit 3. By this processing, the reading circuit 7 generates a focusing error signal that is a position error signal in the focusing direction (not shown) and a tracking error signal 17 that is a position error signal in the tracking direction.

Figure 3:
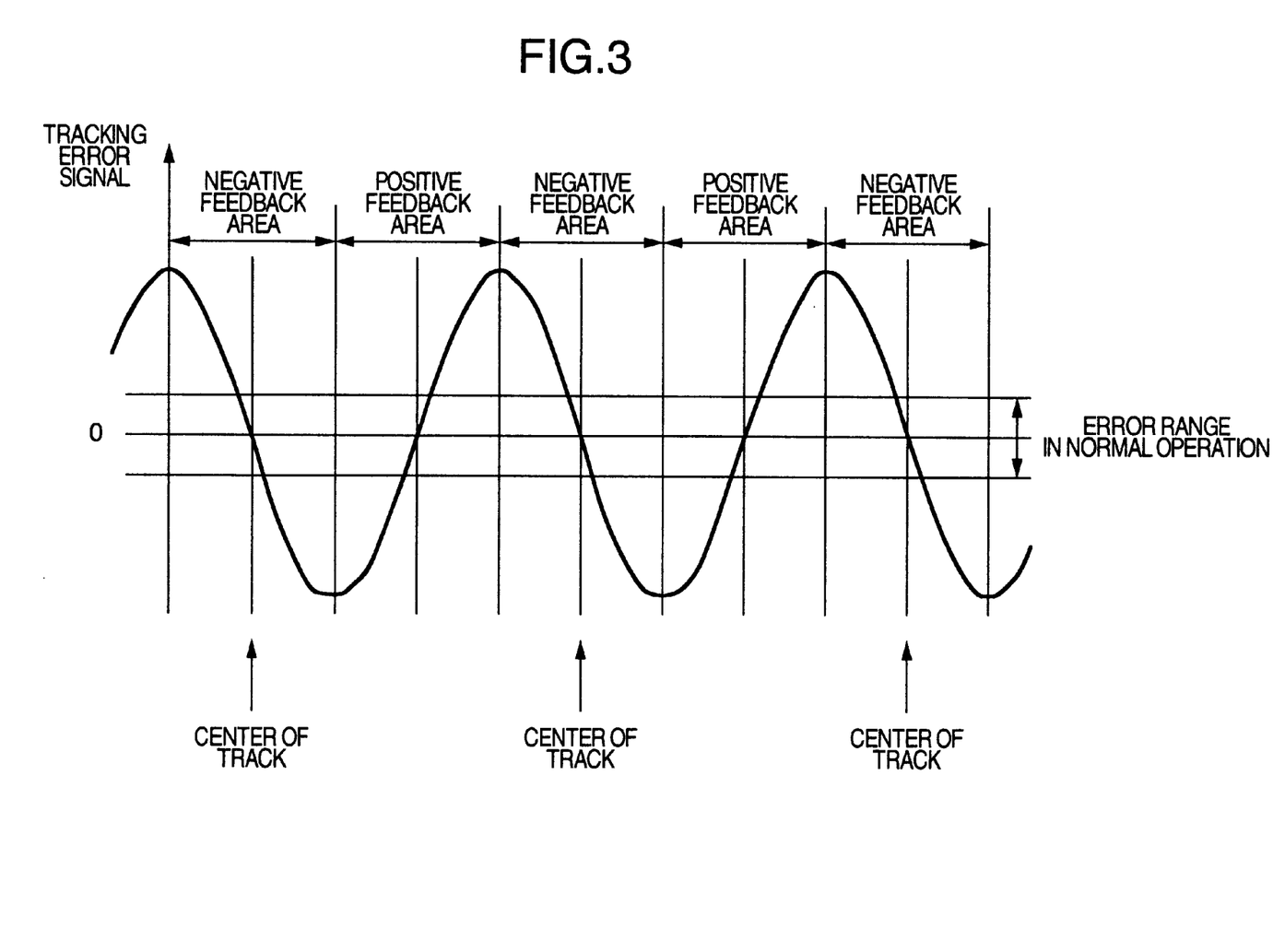
FIG. 3 is a waveform chart showing an example of a characteristic of a tracking error signal.

FIG. 3 shows an example of a characteristic of the tracking error signal 17, in which an axis of abscissa denotes a distance between a light spot and a track and an axis of ordinates denotes a value of the tracking error signal 17. The tracking error signal 17 is made to be zero at the center of the track and at a just middle position between track centers. The normal tracking control is executed in the negative feedback area with the center of track as its center. However, in a case that an application of the external force like an external shock exceeding the maximum generation to the device itself results in the occurrence of the "out of tracking" state, if the light spot position enters into the positive feedback area, the polarity of the tracking error signal 17 is reversed. In this connection, the characteristic of the tracking error signal 17 may be reverse in polarity to that shown in FIG. 3.

The control filter 8 serves to receive this tracking error signal 17 and performs a filtering process through the use of the phase lag lead filter and the like. Then, the filter 8 outputs the first control signal 18.

Figure 4:
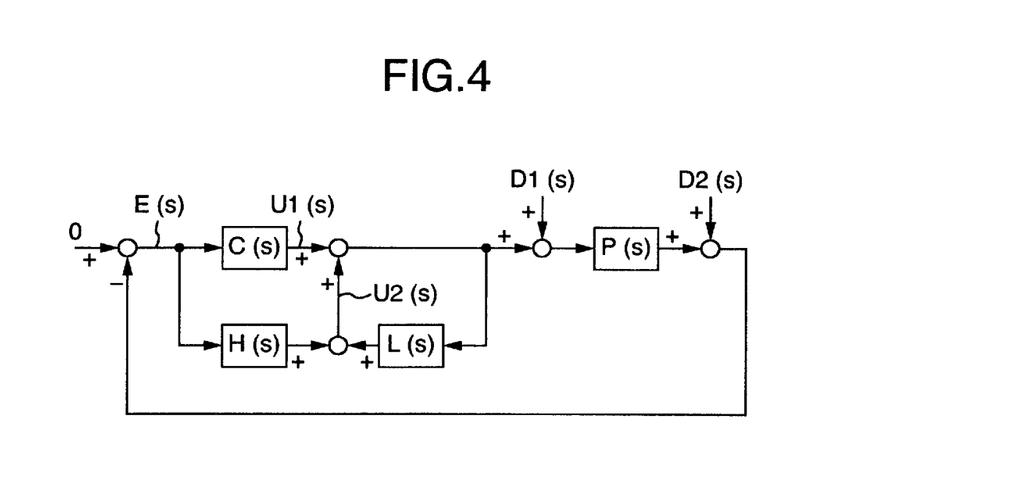
FIG. 4 is a diagram showing an arrangement of a disturbance observer.

FIG. 4 shows an example of an arrangement of the disturbance observer 9. In FIG. 4, P(s) denotes a control object from the sixth control signal 23 to the tracking error signal 17 shown in FIG. 1. C(s) denotes a control filter 8. L(s) and H(s) denote filters constituting the disturbance observer 9. Herein, H(s) is expressed by the following expression 1;

$$H(s) = \frac{L(s)}{PN(s)} \quad (1)$$

wherein PN(s) is a nominal model of the controlled object P(s), E(s) is the tracking error signal 17, U1(s) is the first control signal 18, U2(2) is the second control signal 19, D1(s) is an input disturbance, and D2(2) is an output disturbance, and s denotes a Laplace operator. As one example, the nominal model PN(s) is expressed by the following expression 2;

$$PN(s) = \frac{K}{s^2} \quad (2)$$

where K is a gain. If L(s) is a second order low-pass filter as indicated in the expression (3), H(s) may be composed without a differential operation as indicated in the following expression 4;.

$$L(s) = \frac{\omega D^2}{s^2 + 2\zeta D\omega Ds + \omega D^2} \quad (3)$$

$$H(s) = \frac{\omega D^2}{K} \cdot \frac{s^2}{s^2 + 2\zeta D\omega Ds + \omega D^2} \quad (4)$$

wherein (ωD and ξD are design parameters of the disturbance observer 9. By composing the disturbance observer 9 as indicated above, a transfer function from the input disturbance D1(s) and the output disturbance D2(s) to the second control signal U2(s) may be expressed by the following expression 5.

$$U2(s) = -\{D1(2) + s^2 D2(s)\} \cdot \frac{\omega D^2}{s^2 + 2\zeta D\omega Ds + \omega D^2} \quad (5)$$

Hence, by taking a sufficiently great ωD, the second control signal U2(s) is made to be a signal for canceling the disturbance. In addition, L(s) may be more than a third or higher order low-pass filter. The disturbance observer may be constituted by other methods.

The abnormality detector 26 operates to detect an abnormal state on the basis of the tracking error signal 17 and the second control signal 19. As shown in FIG. 3, the tracking error signal 17 is kept in a certain error range when the normal tracking control is executed. Hence, if the amplitude value of the tracking error signal 17 exceeds a certain range, it is considered that an abnormal state takes place in which an external shock is applied to the device. As indicated in the expression 5, the second control signal 19 is an estimated disturbance. Hence, if the amplitude value of the second control signal 19 exceeds a certain range, it is considered that an abnormal state in which an external shock or the like is applied to the device itself.

Figure 5:
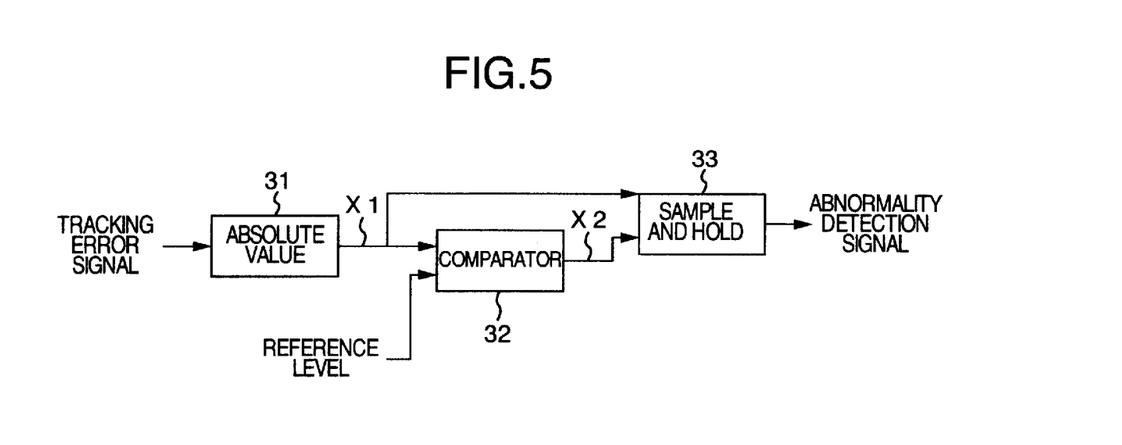
FIG. 5 is a block diagram showing an arrangement of an abnormality detector.
Figure 6:
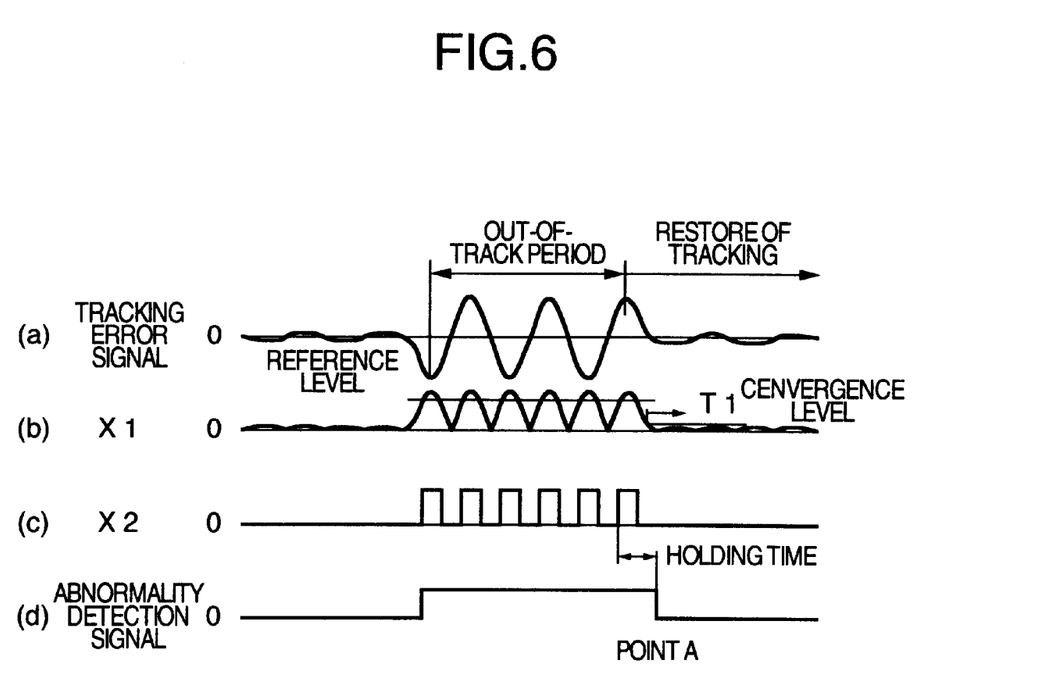
FIG. 6 is a waveform chart showing an example of an operation of the abnormality detector.

FIG. 5 shows an example of an arrangement of the abnormality detector 26. FIG. 6 shows an example of an operation of the abnormality detector 26.

The abnormality detector 26 includes an absolute value unit 31, a comparator 32, and a sample and hold circuit 33. The abnormality detector 26 operates to read the tracking error signal 17. The absolute value unit 31 is inputted with the tracking error signal 17 and then outputs a resulting signal X1 which is an absolute value of the tracking error signal 17. The comparator 32 is inputted with the signal X1 and then compares the signal X1 with a reference level and then outputs a signal X2. The sample and hold circuit 33 operates to hold the signal X1 at the time when the signal X2 is inputted for a certain length of time and then output the signal X1 as an abnormality detection signal 27.

This arrangement makes it possible to adjust the reference level and the holding time, thereby sensing the "out of tracking" state. Herein, it is possible to adjust when the abnormality detection signal 27 at an A point of FIG. 6 is made to be returned to zero by means of the length of the holding time or the time Ti after the signal X1 is converged into the convergence level. When the signal X1 exceeds the reference level, the abnormal state detection may be started. When the signal X1 is converged to a given convergence level for a given time, the abnormal state detection may be terminated. In addition, it is preferable to input the tracking error signal 17 into the absolute value unit 31 after the noise is removed from the signal 17 through the low-pass filter or the like.

If the second control signal 19 is used in place of the tracking error signal 17, the use of the similar arrangement makes it possible to detect an application of external force like an external shock exceeding the maximum generation to the device by adjusting the reference level and the holding time.

Further, the abnormality detector 26 may be composed by other methods. For example, it may be arranged such that the positive feedback area may be detected from the gradient of the tracking error signal 17 or the second control signal 19.

While the abnormality is being detected, the modifying unit 16 operates to modify the second control signal 19 into zero according to the abnormality detection signal 27. Alternatively, while the abnormality is being detected, the modifying unit 16 may perform a low-pass filtering processing on the second control signal 19 or multiply the second control signal 19 by a gain for reducing a signal value. By virtue of these processings, even if the "out-of-tracking" state occurs and the tracking error signal 17 is entered into a positive feedback area and thereby the disturbance estimating operation done by the disturbance observer may be divergent, the adverse effect thereof can be prevented from being applied to the control system, thereby making the "out of track" minimum.

The first adder 10 receives the second control signal 19 modified by the modifying unit 16 and the first control signal 18, adds them to each other, and then output the added signal as the third control signal 20.

The second adder 12 receives the second control signal 19 modified by the modifying unit 16 and the fifth control signal 22, adds them to each other, and then outputs the added signal as the fourth control signal 21. This fourth control signal 21 is stored in the storage unit 11 according to the synchronous signal 24 detected by the synchronous signal detector 15. The synchronous signal 24 may be any signal if it is synchronous with the rotation of the optical disk 1. The synchronous signal detector 15 may be composed of an encoder or the like.

The storage unit 11 is served to output the stored fourth control signal 21 as the fifth control signal 22 according to the synchronous signal 24.

The third adder 13 receives the third control signal 20 and the fifth control signal 22, adds them to each other, and then outputs the added signal as the sixth control signal. This sixth control signal 23 is inputted to the driving circuit 14, in which the tracking control of the objective lens 4 is done by the actuator 6 according to the sixth control signal 23.

The foregoing arrangement allows the fifth control signal 22 to cancel the periodic disturbance exerted on the controlled object and the second control signal 19 to cancel the disturbance remaining uncompensated by the fifth control signal 22 and the other disturbance caused by the vibrations asynchronous with the rotation. As the storage unit 11 is getting updated, the effect of canceling the periodic disturbance of the fifth control signal 22 is gradually increased.

Figure 7:
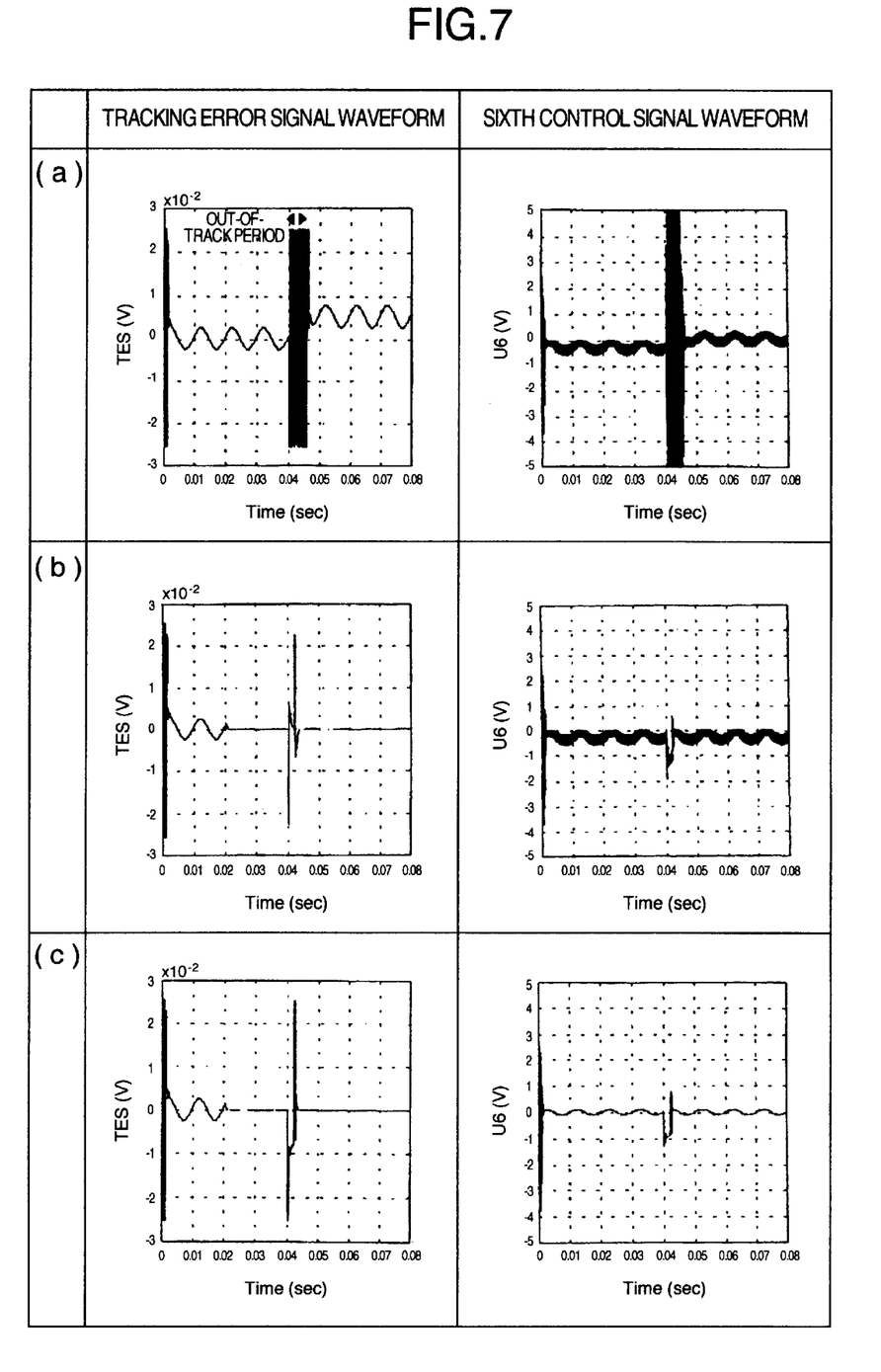
FIG. 7 is a waveform chart showing an exemplary effect of the present invention.
Figure 8:
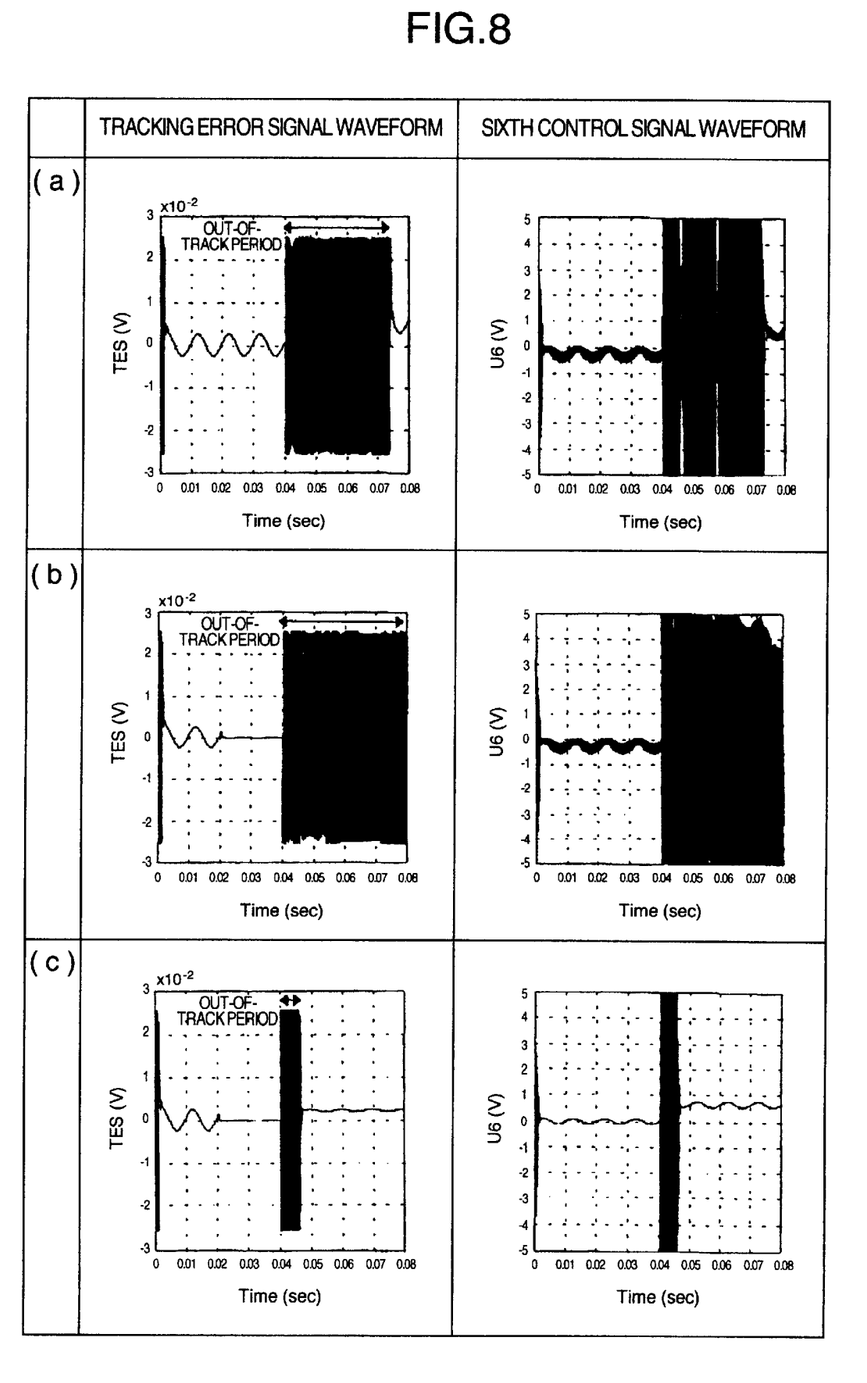
FIG. 8 is a waveform chart showing an exemplary effect of the present invention.

FIGS. 7 and 8 show the waveform charts showing the effect on the "out-of-tracking" the present invention may offer. FIG. 7 is a chart illustrating a waveform appearing in applying an external force that does not exceed the maximum generation of the actuator. FIG. 8 is a chart illustrating a waveform appearing in applying an external force that exceeds the maximum generation of the actuator. In the left-hand view of those charts, an axis of abscissa denotes a time and an axis of ordinates denotes a tracking error signal (TES). In the right-hand view thereof, an axis of abscissa denotes a time and an axis of ordinates denotes the sixth control signal (U6). A constant external force is being applied between 0.4 second and 0.42 second. FIG. 7(a) is a chart illustrating a waveform caused by a prior art apparatus. This prior art apparatus is arranged such that the control filter 8 is a phase lag lead filter generally used in optical disk devices and does not include the disturbance observer 9, the first adder 10, the storage unit 11, the second adder 12, the third adder 13, the modifying unit 16, and the abnormality detector 26. FIG. 7(b) is a chart illustrating a waveform caused by the prior art apparatus disclosed in JP-A-6-267211. This prior art apparatus does not include the modifying unit 16 and the abnormality detector 26. FIG. 7(c) is a chart illustrating a waveform caused by the present invention. In addition, the abnormality detector 26 operates to detect the positive feedback area from the gradient of the tracking error signal 17 and then output the abnormality detection signal 27 accordingly. The modifying unit 16 operates to modify the second control signal 19 to zero according to this abnormality detection signal 27.

If the external force shown in FIG. 7 does not exceed the maximum generation of the actuator, in the waveform shown in FIG. 7(a), the actuator brings about the "out of tracking" and then moves the head to the different track in which the tracking control is returned. On the other hand, in FIG. 7(b)(c), the disturbance observer 9 is served to cancel an emergent external force. Hence, in the case where the external force does not exceed the range of the maximum generation of the actuator, the actuator does not bring about the "out of tracking" state, so that the head may be kept in the same track.

Figure 9:
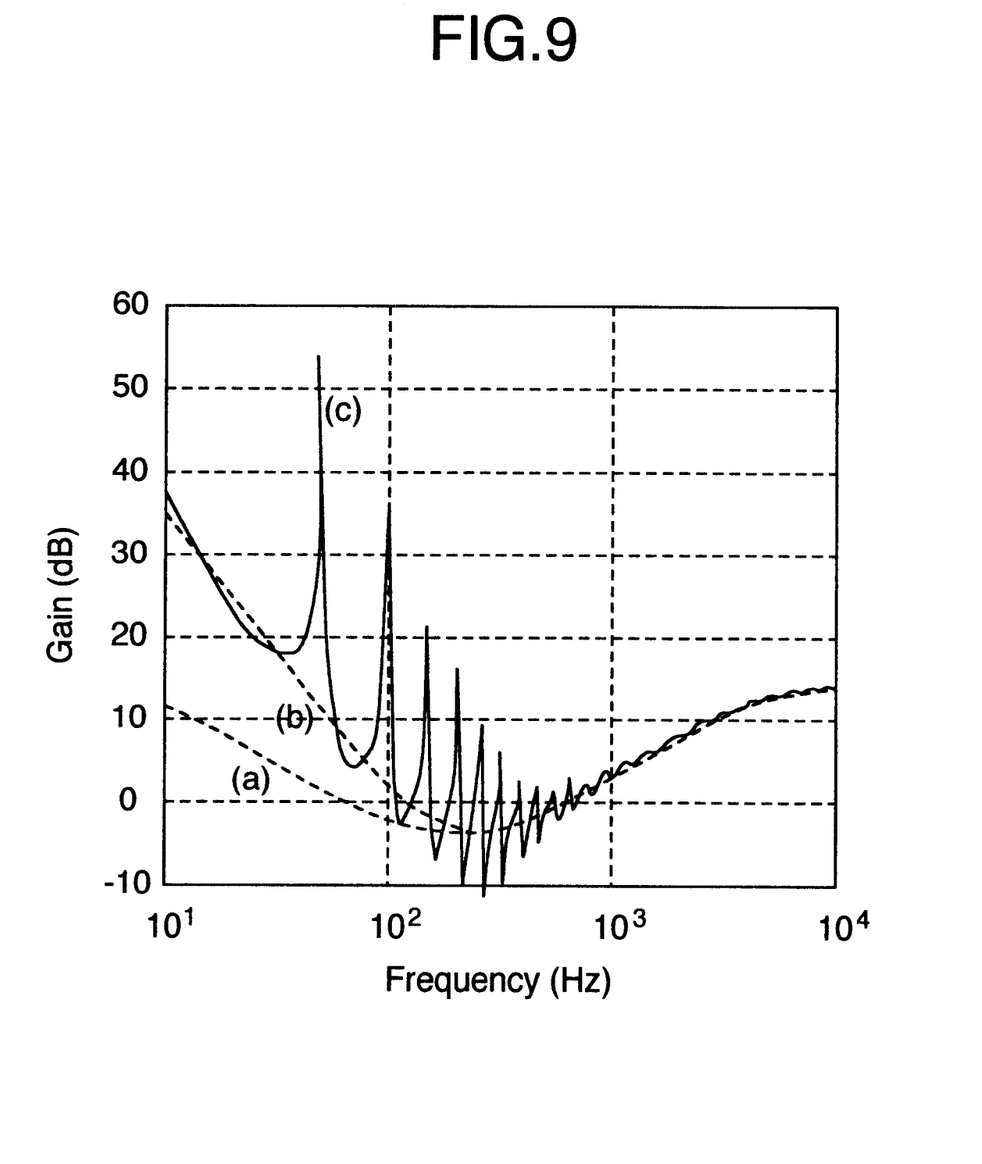
FIG. 9 is a frequency characteristic chart showing an exemplary effect of the present invention.

On the other hand, if the external force shown in FIG. 8 exceeds the maximum generation of the actuator, the chart (a) of FIG. 8 illustrates that the period of the "out-of-tracking" is extended. However, the head mores to a different track and the tracking control is restored there. (b) in FIG. 8 illustrates the head is kept moving in the "out-of-tracking" state and no tracking control is restored. This is because the tracking error signal 17 gets out of the controllable negative feedback area, has an opposite polarity to the positive feedback area and thus the disturbance estimating operation of the disturbance observer 9 is divergent. In contrast thereto, the chart (c) shown in FIG. 8 according to the present invention illustrates that the second control signal 19 is made zero in response to the abnormality detection signal 27. Hence, the tracking control is quickly restored from the "out-of-tracking" state. Let us compare the number of tracks in the "out-of-tracking" states among the charts shown at (a), (b) and (c) in FIG. 8. In (a), the number of the tracks in such state is 1135. In (b), it is 1472 (within the display area) or more. In (c), it is 301. According to the present invention, therefore, the number of the out of tracks may be reduced to about a quarter as compared to the prior art shown in (a). Further, it is reduced to about ⅕ as compared to the prior art shown in FIG. 9 shows a frequency characteristic chart from the tracking error signal 17 to the sixth control signal 23. An axis of abscissa denotes a frequency and an axis of ordinates denotes a gain. (a) at FIG. 9 shows a frequency characteristic chart according to a prior art apparatus. This prior art apparatus is arranged such that the control filter 8 is a phase lag lead filter generally used in optical disk apparatuses and does not include the disturbance observer 9, the first adder 10, the storage unit 11, the second adder 12, the third adder 13, the modifying unit 16, and the abnormality detector 26. (b) at FIG. 9 is a frequency characteristic chart of the prior art apparatus mentioned at (a) with the disturbance observer 9 and the first adder 10 added. (c) at FIG. 9 shows a frequency characteristic chart of the prior art apparatus explained with (b) at FIG. 9 with the storage unit 11, the second adder 12 and the third adder 13 further added. During the normal tracking control operation, the frequency characteristic may be measured by overlapping a sinusoidal waveform with the tracking error signal 17 or the sixth control signal. Alternatively, for this purpose, only the control unit 25 may be measured. In this case, as the synchronous signal 24, a signal of a predetermined period may be used.

When a curve (a) of FIG. 9 is compared with a curve (b) of FIG. 9, the curve (b) shows that the low frequency area has a larger gain. This is an effect given by the disturbance observer 9. The effect of suppressing the disturbance that corresponds to the larger amount of gain is increased. Further, when (b) and (c) of FIG. 9 are compared to each other, the curve (c) shows that the gain in a certain frequency is especially increased. This is an effect given by repetitively storing the fifth control signal 22 in the storage unit 11. The effect of suppressing the disturbance is increased by a corresponding amount to the larger gain. The frequency at which the gain is increased is changed according to the frequency of the synchronous signal 24 and appears at each integral multiple of the frequency of the synchronous signal 24.

Figure 10:
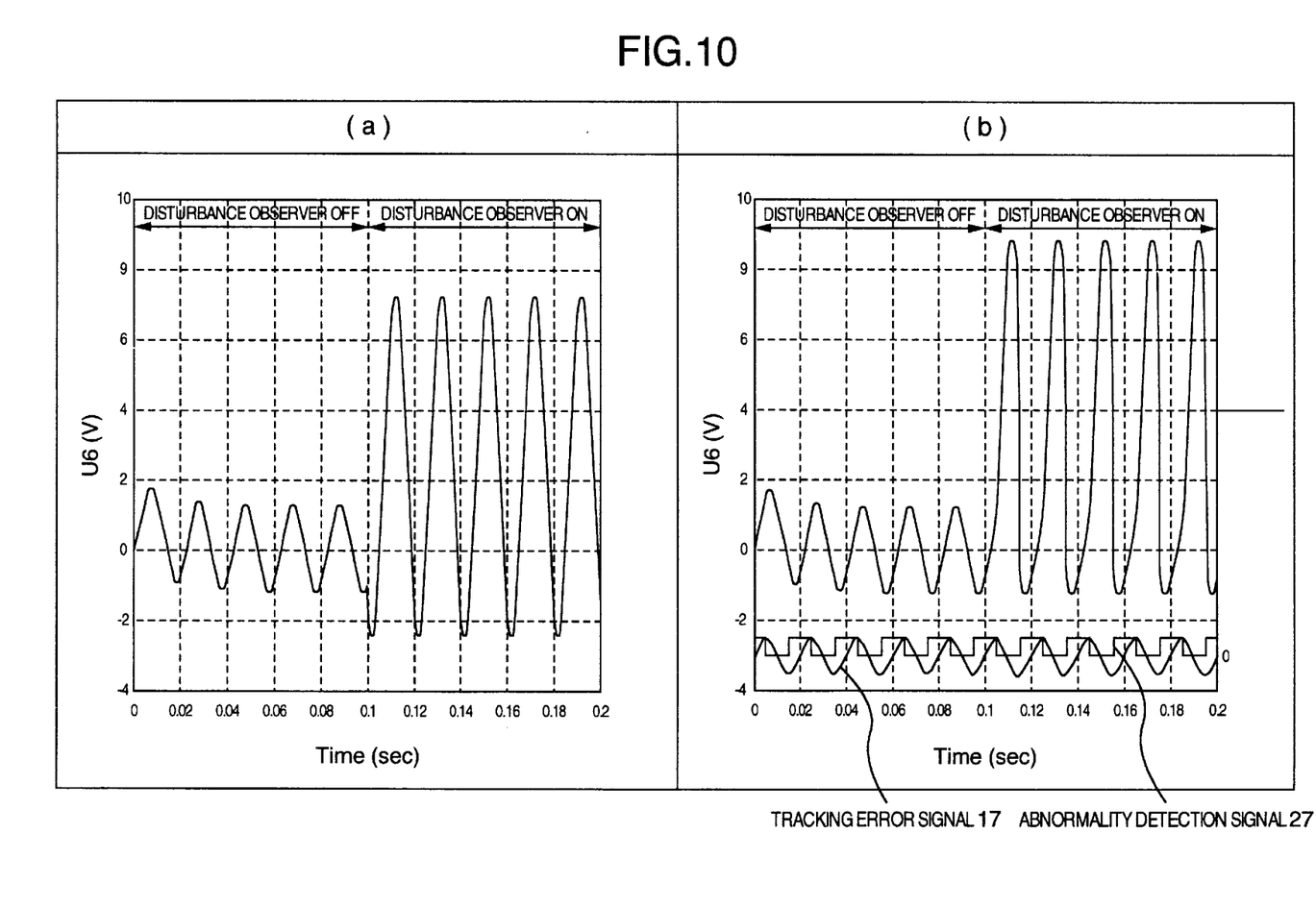
FIG. 10 is a waveform chart showing an example of a characteristic of the present invention.

FIG. 10 is a waveform chart showing an exemplary characteristic of the present invention. In FIG. 10, an axis of abscissa denotes a time and an axis of ordinates denotes the sixth control signal (U6) given by inputting a sinusoidal wave as the tracking error signal 17 to the control unit 25 isolated from the remaining circuitry. (a) in FIG. 10 is a waveform chart according to the prior art disclosed in JP-A-6-267211. The prior art does not include the modifying unit 16 and the abnormality detector 26. (b) in FIG. 10 is a waveform chart according to the present invention. In this invention, the abnormality detector 26 detects a positive feedback area from a gradient of the track error signal 17 for outputting an abnormality detection signal 17. The modifying unit 16 operates to modify the second control signal 19 into zero in response to the abnormality detection signal 27. The synchronous signal 24 is fixed to zero.

Comparing (a) with (b), in (b), the second control signal 19 is modified into zero in the positive feedback area of the tracking error signal 17. Hence, even after the disturbance observer is turned on, output is the waveform that appears when the disturbance observer is off in the positive feedback area of the tracking error signal 17.

Figure 2:
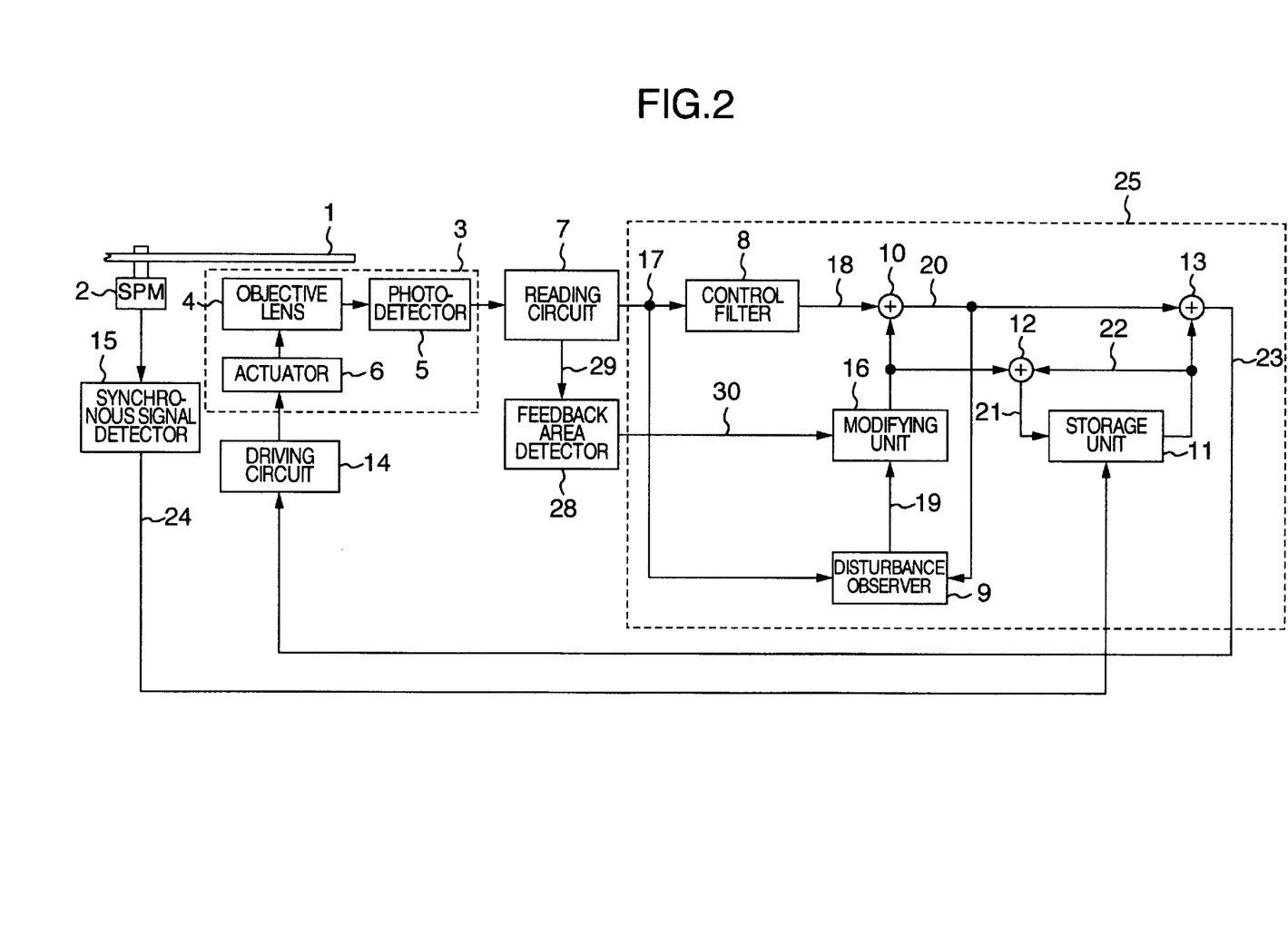
FIG. 2 is a block diagram showing an actuator control device according to a second embodiment of the invention.

Hereafter, the second embodiment of the invention will be described with reference to the appended drawings. FIG. 2 is a block diagram showing an optical disk apparatus to which the actuator control device according to the second embodiment of the present invention is applied.

This embodiment is different from the first embodiment in the provision of the feedback area detector 28 in place of the abnormality detector 26 in FIG. 1.

Figure 11:
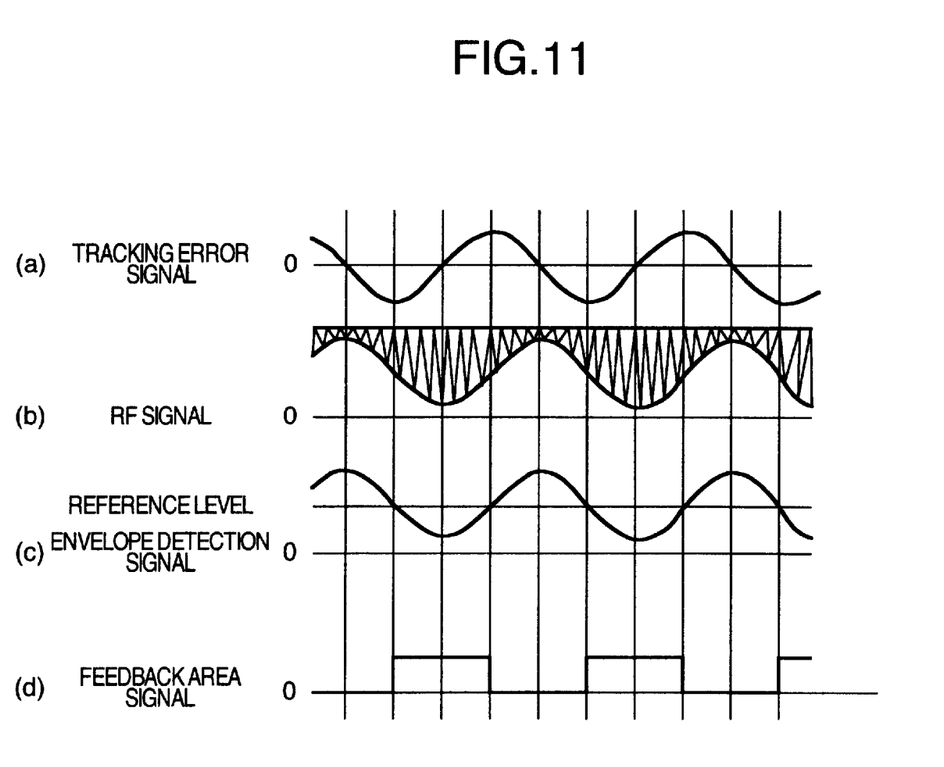
FIG. 11 is a chart showing an example of an operation of a feedback area detector.

FIG. 11 shows an example of an operation of the feedback area detector 28. The feedback area detector 28 operates to receive a RF signal 29 having the level corresponding to the light reflection from the optical disk 1, detect an envelope of the RF signal 29, compare the envelope detection signal with a reference level signal, and then output it as a feedback area signal 30 of a binary square pulse. The binary values of the feedback area signal 30 composed of a square pulse correspond to the positive feedback area and the negative feedback area of the tracking error signal 17, respectively. This feedback area signal 30 is applied to the modifying unit 16 in place of the abnormality detection signal 27 that has been used in the first embodiment.

The foregoing arrangement makes it possible to modify the second control signal 19 according to the feedback area signal 30. Hence, even if the "out of track" takes place, the tracking control may be quickly restored.

The second embodiment utilizes the feedback area detector 28 for detecting an abnormal state such as an "out-of-track" state. In place of the feedback area detector 28, a vibration detector such as an accelerometer may be provided for detecting vibrations so that the output of the vibration detector may be used for detecting an abnormal state. For example, the output of the vibration detector is compared with a predetermined reference level and the period of time during which the output of the vibration detector exceeds the reference level plus a predetermined period of time added thereto may be determined as an abnormality detection period of time. Alternatively, the output of the vibration detector is compared with a predetermined reference level. Then, the abnormality detection may be started when the output of the vibration detector exceeds the reference level and may be terminated when the tracking error signal 17 and the second control signal 19 are converged into a predetermined convergence level for a given length of time.

The foregoing arrangement makes it possible to detect an abnormal state such as addition of an external force like an external shock exceeding the maximum generation of the actuator and modify the second control signal 19 according to the detected abnormality. If, therefore, the "out of track" may take place, the tracking control may be quickly restored.

As set forth above, according to the present invention, the disturbance observer is served to estimate a disturbance applied to the actuator and add the second control signal corresponding to the estimated disturbance to the first control signal for deriving the third control signal. Further, the second control signal is stored in the storage unit and the stored value is added to the third control signal as the fifth control signal. With the foregoing arrangement, the fifth control signal serves to cancel the periodic disturbance exerted on the controlled object and the second control signal serves to cancel the disturbance remaining uncompensated by the fifth control signal and the disturbance such as vibration asynchronous with the rotation. Further, the effect of the fifth control signal for canceling the periodic disturbance is gradually increased as the storage unit is getting updated.

In the case of application of an external force like an external shock to the apparatus, the out-of-track phenomenon may be prevented if the external force is equal to or less than the maximum generation of the actuator. Further, even if the out-of-track phenomenon takes place in the case of application of an external force like an external shock exceeding the maximum generation of the actuator to the apparatus, the second control signal may be modified into zero for quickly restoring the tracking control.

What is claimed is:

1. An actuator control device comprising:
   a disturbance observer;
   an abnormality detector which detects an application of an external force including an external shock that exceeds a maximum force generated by an actuator thereby driving said actuator into an out-of-tracking state; and a modifying unit which modifies an output of said disturbance observer according to the output of said abnormality detector.

2. An actuator control device comprising:

a head which at least reproduces information from a disk;

an actuator which moves said head;

a position detector which detects a position of said head;

a control unit which controls said actuator based on the output of said position detector;

a disturbance observer which estimates disturbance added to said actuator;

a storage which stores the disturbance estimated by said disturbance observer;

an adder which adds the output of said disturbance observer and the output of said storage to the output of said control unit;

a driving circuit which drives said actuator based on the output of said adder;

an abnormality detector which detects an application of am external force exerted on a disk apparatus which drives the disk apparatus into an out-of-tracking state, based on the position of said head and the output of said disturbance observer; and a modifying unit which modifies the output of said disturbance observer according to the output of said abnormality detector.

3. An actuator control device comprising:

a head which at least reproduces information from a disk;

an actuator which moves said head;

a position detector which detects a position of said head;

a control unit which controls said actuator based on the output of said position detector;

a disturbance observer which estimates disturbance added to said actuator;

a storage which stores the disturbance estimated by said disturbance observer;

an adder which adds the output of said disturbance observer and the output of said storage to the output of said control unit;

a driving circuit which drives said actuator based on the output of said adder;

an abnormality detector which detects an application of an external force exerted on a disk apparatus based on the position of said head and the output of said disturbance observer; and a modifying unit which modifies the output of said disturbance observer according to the output of said abnormality detector, wherein said abnormality detector includes a feedback area detector which detects a positive feedback area and a negative feedback area at the position of said head.

4. An actuator control device according to claim 2, wherein said abnormality detector includes a vibration detector to detect vibrations.

5. An actuator control device according to claim 4, wherein said abnormality detector includes an accelerometer or a vibrometer.

6. An actuator control device according to claim 2, wherein said abnormality detector includes a feedback area detector which detects a positive feedback area and a negative feedback area at the position of said head.

7. An actuator control device according to claim 1, wherein said abnormality detector includes a feedback area detector which detects a positive feedback area and a negative feedback area at the position of a head.

8. An actuator control device according to claim 1, wherein said abnormality detector includes a vibration detector to detect vibrations.

9. An actuator control device according to claim 8, wherein said abnormality detector includes an accelerometer or a vibrometer.

10. An actuator control device according to claim 3, wherein said abnormality detector includes a vibration detector to detect vibrations.

11. An actuator control device according to claim 10, wherein said abnormality detector includes an accelerometer or a vibrometer.

* * * * *